United States Patent

Guest

[15] 3,691,819

[45] Sept. 19, 1972

[54] LEAK DETECTOR AND METHOD

[72] Inventor: Robert J. Guest, Duncan, Okla.

[73] Assignee: Halliburton Company, Duncan, Okla.

[22] Filed: Jan. 4, 1971

[21] Appl. No.: 103,421

[52] U.S. Cl. ..............................73/40.5 A, 346/33 P
[51] Int. Cl. .............................................G01m 3/24
[58] Field of Search ................73/40.5 A, 40.5 R, 40; 346/33 P

[56] References Cited

UNITED STATES PATENTS

| | | |
|---|---|---|
| 2,940,302 | 6/1960 | Scherbatskoy..........73/40.5 A |
| 3,508,433 | 4/1970 | Bustin.....................73/40.5 A |
| 2,884,624 | 4/1959 | Dean et al...........73/40.5 A X |

*Primary Examiner*—Louis R. Prince
*Assistant Examiner*—William A. Henry, II
*Attorney*—Burns, Doane, Swecker & Mathis

[57] ABSTRACT

A method and system for locating leaks in a pipeline under hydrostatic pressure by traversing the pipeline with a self-propelled pig having an acoustic leak detecting capability, stopping the pig in response to leak detection, and restarting the pig responsively to locating the pig and/or to the termination of the transient nose initially detected as a leak. A transmitter external of the pipeline is utilized to transmit an interrogation wave energy signal and the responsive wave energy signal transmitted by the pig is synchronized therewith. Power is conserved by limiting the pig transmissions to a direct response to the interrogation signal.

18 Claims, 2 Drawing Figures

INVENTOR
ROBERT J. GUEST

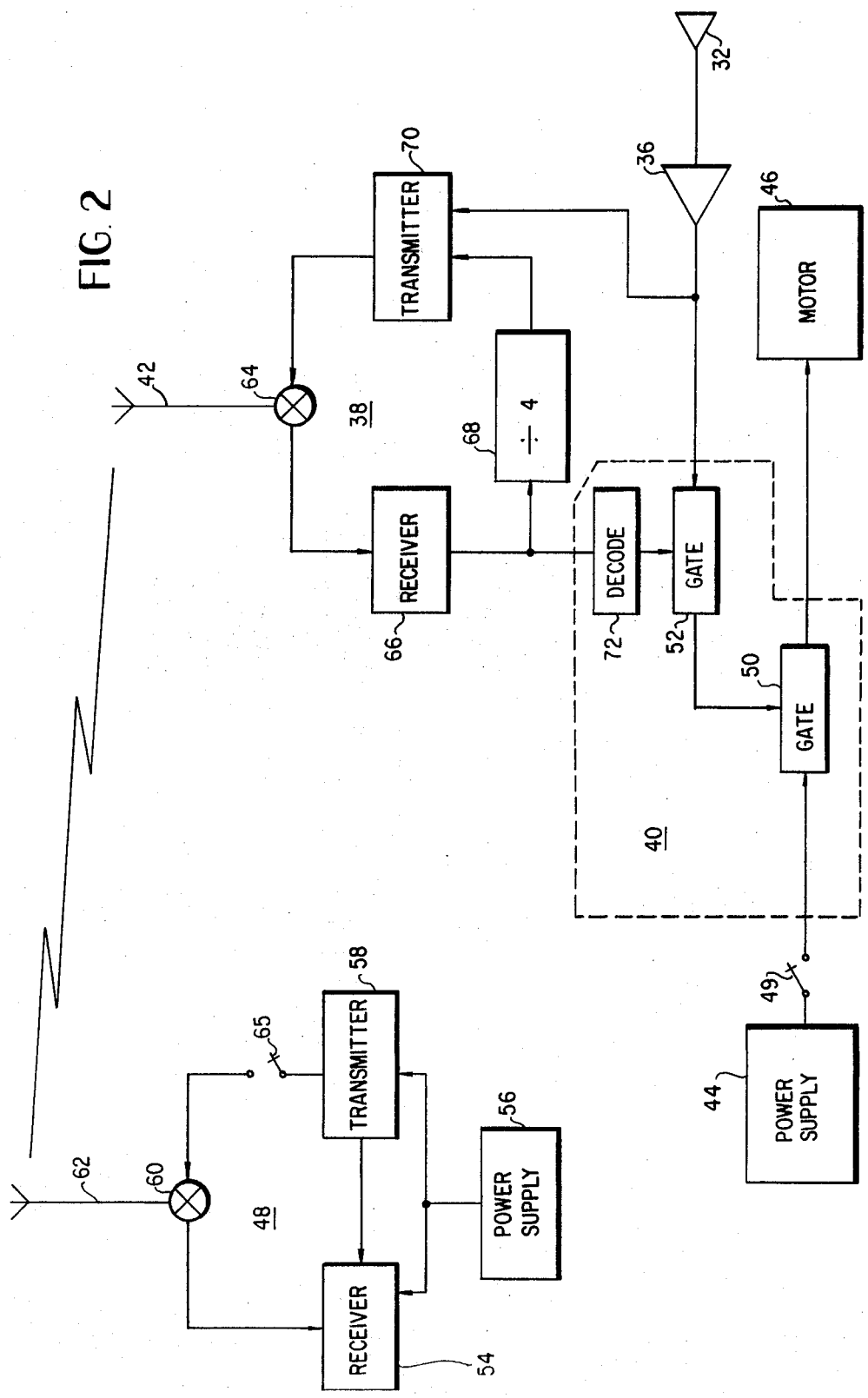

LEAK DETECTOR AND METHOD

BACKGROUND OF THE INVENTION

The present invention relates to a method and system for leak detection in a fluid pipeline and more specifically to a method and system for determining the location of leaks in a pipeline under hydrostatic pressure.

The system of the present invention has particular utility in the location of leaks in an underground pipeline in which leak detection is difficult and, in the event the fluid is a hydrocarbon, often extremely hazardous to personnel and to property along the pipeline route.

Where the presence of the fluid is incompatible with plant life, as in the case of hydrocarbons such as fuel oil and gasoline, one known method of detecting leaks in cross-country pipelines is that of aerial observation for dead vegetation along the known pipeline route. Aerial observation is not only very expensive, but the leaks must generally be quite large for dead vegetation to be detected or leak responsive. In addition, fluid from the pipeline may flow into underground faults and surface vegetation may not be affected by the leak. Pipelines, moreover, are often laid where no vegetation exists, i.e., across barren ground or underneath roadbeds where leaks often occur due to the vibrations which result from surface vehicular travel.

Another known method of leak detection has involved the use of leak detecting pigs to internally traverse the pipeline. The pigs have been winched through the pipeline by means of a cable and have also been configured to permit the flow of the fluid within the pipeline to provide the propulsion for the pig. Whether propelled by the fluid or by cable, the pig generally carries one or more transducers to sense the leak. These transducers may be responsive to pressure and utilized to sense the pressure differential between the segment of the pipeline currently under investigation and the pipeline as a whole. The transducers may also be temperature responsive to detect a temperature change at the location of the leak or they may be frequency sensitive to acoustically detect the sound of the leak.

The position of the pig in the pipeline at the time of leak detection has in general been determined by correlation of the leak transducer output signal with an odometer connected roller turning against the internal wall of the pipeline. Alternatively, the length of the cable utilized to winch the pig through the pipeline may be measured, or a sensor utilized to count the number of welds or other magnetic markers along the length of the pipeline.

Each of these known pig locating expedients suffers from disadvantages. For example, winching a pig through the pipeline by a cable may be both expensive and impractical due to the length and configuration of the pipeline. The use of an odometer connected to a roller may be inaccurate due to slip of the roller relative to the internal pipeline surface, particularly where the fluid has lubricative characteristics as in the case of fuels. The utilization of magnetic markers or weld counting is generally unsatisfactory for pig location due to the insufficient or inaccurate information generally recorded relative to the placement of welds or markers during the initial laying of the pipeline. The use of sonic transducers is additionally discouraged by the large amount of low frequency noise generated internally by fluid flow and externally by surface vehicular traffic, etc. along the pipeline route. Frequency discrimination requires internal pressurization of the pipeline and has not been generally possible due to the dangers of explosion and fluid loss inherent in pressurization of the pipeline while in service.

It is accordingly an object of the present invention to obviate the deficiencies of the prior art and to provide a novel method and pig for detecting and locating leaks in a fluid pipeline.

It is another object of the present invention to provide a novel pig and method for propelling a leak detecting pig through a pipeline.

It is still another object of the present invention to provide a novel method and pig for detecting leaks concurrently or in association with the hydrostatic testing of pipelines.

It is yet another object of the present invention to provide a novel pig and method for determining the location thereof within a fluid pipeline.

It is yet another object of the present invention to provide a novel pig and method for controlling the movement thereof through a pipeline.

Other applications, objects and advantages will, however, be readily apparent to one skilled in the art to which the invention pertains from the claims and from the following detailed description of a preferred embodiment when read in conjunction with the appended drawings.

THE DRAWINGS

FIG. 2 is a functional block diagram of the electrical circuit of the pig and surface radio of FIG. 1.

THE DETAILED DESCRIPTION

Figure 1:
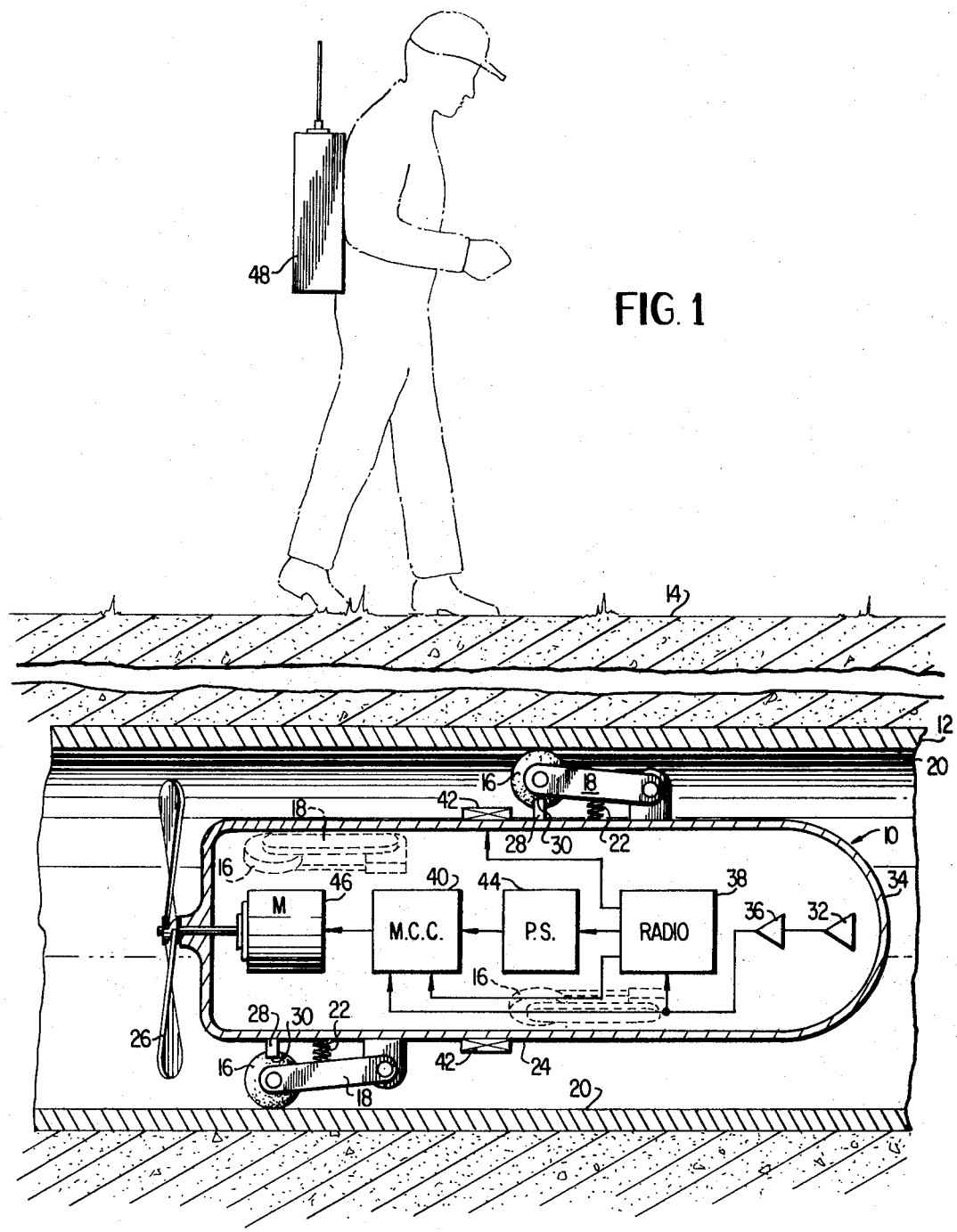
FIG. 1 is a schematic illustration of the pig of the present invention.

With reference now to FIG. 1, a pig 10 is illustrated within a pipeline 12 buried below the surface 14 of the ground. The pig 10 may be provided with rollers 16, six in number in the embodiment illustrated disposed at approximately 60° intervals around the pig 10. Each of the rollers 16 is connected to the pig 10 by means of a pivot arm 18 and each of the rollers 16 is firmly biased into contact with the internal wall 20 of the pipeline 12 by a spring 22 disposed between the outer surface 24 of the pig 10 and the pivot arm 18.

The bias of the springs 22 is sufficient to center the pig 10 within the pipeline 12, thereby protecting the screw 26 from contact with the internal walls 20 of the pipeline 12. A mechanical stop 28 may be provided to limit the compression of the spring 22 by abutment of the pivot arm 18 with the end 30 of the stop 28. The stops 28 may be adjustable in length and may, for example, be bolts threaded into the wall of the pig 10 so that the pig 10 may be utilized in pipes of various internal diameters.

A transducer 32 may conveniently be mounted in the nose portion of the pig 10 and comprises, in the embodiment illustrated, a conventional microphone capable of responding to wave energy in the ultrasonic range. The microphone 32 may be isolated from the fluid within the pipeline by means of a shield 34 of an ultrasonic wave energy pervious material. The microphone 32 is conveniently mounted at the extreme forward portion of the pig 10 to enhance the separation between the microphone 32 and the propulsion means, i.e., the screw 26, located in the rear of the pig.

The electrical output signal from the microphone 32 may be amplified in a conventional amplifier 36 of the band pass variety so that the signals outside the desired ultrasonic frequency range are attenuated. The amplified output signal from the microphone 32 may then be applied to a radio 38 and to the motor control circuit 40 subsequently to be described in connection with FIG. 2.

The radio 38 is connected in a conventional manner to a suitable antenna 42 disposed on the external surface 24 of the pig 10 intermediate the ends thereof. The antenna 42 is a conventional bilateral device capable of transmitting or receiving electromagnetic wave energy.

The amplified output signal from the microphone 32 is also applied to the motor control circuit 40 which controls in a conventional manner the application of electrical power from a power supply 44 to a motor 46 drivingly connected to a conventional propeller or screw 26 to provide the propulsion of the pig 10 through the pipeline 12.

The radio 38 is also electrically connected to the motor control circuit 40 and the power supply 44 is electrically connected to the motor control circuit 40 and the radio 44 as the sole source of power for the pig 10.

While not specifically illustrated, the motor 46 may include appropriate gearing so that the speed of the screw 26 may be selected to provide thrust for the pig 10 while minimizing to the extent possible the noise generation and this the interference with the microphone 32.

Above the surface 14 of the ground and movable thereover, either by a backpack as illustrated, or some other convenient means such as a conventional vehicle (not shown), a radio 48, including a transmitter and a receiver, is provided to communicate with the pig 10 within the pipeline 12 in a manner hereinafter to be described.

In operation, the pig 10 may be inserted in a pipeline 12 and the fluid within the pipeline pressurized, for example, by pumping additional fluid therein. The pressurization of the fluid in the pipeline 12 is desirable in the embodiment disclosed for the reason that the leak detection by means of the microphone is facilitated due to the frequency of the noise generated by a high pressure leak. It has been found convenient, for example, to utilize the pig and method of the present invention in testing oil and gas pipelines immediately after the hydrostatic testing thereof required upon the initial installation of the pipeline and periodically thereafter. The pressurization of the pipeline 12 may thus be accomplished with water, thus eliminating much of the danger and the expense of fluid loss in the event that a rupture of the pipeline occurs. The internal pressure of the pipeline 12 need not be as high as the pressure utilized in the hydrostatic test and thus the danger of rupture is quite remote.

The pig 10 may be initially set in motion by any convenient means such as an electromagnetic wave signal from the transmitter of the surface radio 48, a pressure-sensitive switch (not shown), or the closure of a mechanical switch 49 illustrated in FIG. 2. The pig 10 will be propelled by the screw 26 internally through the pipeline 12. As the pig 10 internally traverses the pipeline 12, the microphone 32, upon the detection of an ultrasonic noise, will provide a signal which will be amplified in the bandpass amplifier 36 and applied to the motor control circuit 40 to effectively disconnect the motor 46 from the power supply 44. The termination of screw 26 rotation will, of course, remove the propulsion force from the pig 10 and the pig will stop in the vicinity of the sound detected by the microphone 32.

The pig 10 will remain in the vicinity of the leak so long as the detection of the ultrasonic noise continues by the microphone 32. In the event that the detection of the ultrasonic noise terminates, the inhibiting signal applied to the motor control circuit 40 from the amplifier 36 will be removed and the power supply 44 effectively reconnected to the motor 46 to again effect the rotation of the screw 26 and thus the propulsion of the pig 10 through the pipeline 12. In this manner, the pig 10 is able to distinguish between the continuing noise of a leak and transient noise generated by the passage of vehicles, etc. over the surface 14 in the vicinity of the pig.

Assuming that the ultrasonic noise detected by the microphone is a continuing noise, the pig 10 will remain in the vicinity of the noise until restarted by a signal from the transmitter of the surface radio 48. For power conservation purposes, no signal is transmitted from the pig 10 until an interrogation signal is received from the surface radio 48. The pig 10 may, however, transmit a signal immediately upon the detection of a leak.

The pig 10, and thus the leak in the pipeline 12, is located by traversing the surface 14 in the vicinity of the pipeline 12 with the radio 48. As earlier stated, the surface radio 48 may be transported in a suitable vehicle or by means of a backpack as illustrated, depending upon the surface impediments and the distance involved.

A continuing interrogation signal may be broadcast from the transmitter of the surface radio 48. When this signal is detected by the receiver in the radio 38 of the pig 10, and when the transmitter is enabled by the detection of a leak, the transmitter in the pig radio 38 will transmit, by way of the antenna 42, a signal responsively thereto. This response signal will be received by the receiver of the surface radio 48 and conventional signal optimizing techniques utilized to determine the position on the surface 14 at which the surface radio 48 is in the closest proximity to the pig 10 within the pipeline 12.

To enhance the signal distinguishing capability, the frequency of the interrogation signal transmitted by the transmitter of the surface radio 48 and received by the receiver of the pig radio 38 may be effectively reduced, e.g., by a factor of 4, and utilized to control the transmission of the signal from the transmitter of the pig radio 38 to the receiver of the surface radio 48. The signal transmitted from the pig 10 will thus always be related to the frequency of the interrogation signal from the surface radio 48. The utilization of a conventional synchro detector in the receiver of the surface radio permits the tracking of the pig 10 transmitted signal irrespective of frequency drift in the interrogation signal transmitted from the surface radio 48.

Once the operator of the surface radio 48 has determined that the surface radio 48 and pig radio 38 are in immediate proximity, he may note the location of the leak and superimpose on the interrogation signal a restart signal by a conventional keying technique. When the restart signal is detected by the receiver of the pig 10 radio 38, the inhibiting signal applied to the motor control circuit 40 from the amplifier 36 is overridden. The surface operator is thus able to effectively reconnect the power supply 44 to the motor 46 and thus to restart the propulsion of the pig 10 internally through the pipeline 12. The restart signal received by the pig 10 from the surface radio may effect a time delay sufficient in the enabling of the microphone 32 so that the leak previously detected will be to the rear of the microphone 32 a distance sufficient to remove the propulsion-inhibiting signal from the microphone 32.

The operation of the motor control circuit 40 to provide the various control functions earlier described may be more readily understood by reference to the functional block diagram of FIG. 2. With reference now to FIG. 2, and assuming an initial condition in which the pig 10 is internally traversing the pipeline 12, electrical power from the power supply 44 is applied through the normally closed gate 50 to the motor 46 to effect propulsion of the pig 10. Upon detection of a leak by the microphone 32, a signal will be generated which is amplified in the bandpass amplifier 36 and passed through a normally closed gate circuit 52 to the control terminal of the gate 50, thereby disconnecting the power supply 44 from the motor 46. The pig 10 will remain in this posture with an inhibiting signal supplied from the microphone 32 to the gate 50 until the pig 10 is located by the surface unit.

The surface radio 48 includes a conventional receiver 54, power supply 56, and transmitter 58 connected appropriately through a transmit-receive switch 60 to an antenna 62. A manually controlled switch 65 may be utilized by the operator of the surface radio 48 to interrupt or amplitude modulate the signal from the transmitter 58 transmitted by the antenna 62.

With the switch 65 in a closed position, the surface radio 48 will broadcast an interrogation signal from the transmitter 58. This signal will be detected by the antenna 42 of the pig 10 and coupled through a transmit-receive switch 64 to the receiver 66. The output signal from the receiver 66 will be fed through a conventional divide-by-four circuit 68 to the transmitter 70 which will transmit a signal responsively thereto. The signal generated by the transmitter 70 will be fed through the transmit-receive switch 64 and broadcast by the antenna 42. This response signal will be detected by the antenna 62 of the surface radio 48 and identified by means of a synchronous detector within the receiver 54 as emanating from the pig 10.

Once the operator of the surface radio 48 has located the pig 10 by conventional signal-optimizing techniques, the operator may successively open and close the switch 64 to interrupt the signal transmitted by the surface radio 48. The interruptions in the signal transmitted by the surface radio 48 will be detected by the receiver 66 and decoded in a suitable conventional decode circuit 72 within the motor control circuit 40 as a restart signal. This restart signal will be applied from the decode circuit 72 to the control electrode of the gate 52 to thereby effect the inhibiting thereof and thus the removal of the signal from the microphone 32 to the gate 50. Removal of the signal from the gate 52 to the gate 50 will permit the gate to resume its normally closed position, thus connecting the power supply 44 to the motor 46 and reinitiating propulsion of the pig 10 internally through the pipeline 12. The decode circuit 72 may be of the type which latches immediately for a predetermined time so that the gate 52 will be inhibited for a predetermined period of time. The length of the time interval during which the gate 52 is inhibited may be selected to permit the motor 46 to propel the pig a distance through the pipeline 12 sufficiently for removal of the effects of the leak from the microphone 32. In other words, the microphone 32 will be non-responsive to the detected leak for a period of time sufficiently for the distance between the microphone 32 and the detected leak to render the microphone non-responsive thereto.

Although the invention has been described in detail with reference to a preferred embodiment, it will be understood that variations and modifications can be effected without deviating from the spirit and scope of the invention. For example, the electrical motor propulsion system disclosed may be replaced by a pump or other fluid propulsion system, or, alternatively, by drivingly connecting the motor to the rollers engaging the internal walls of the pipeline 12. Although the use of a pressurized pipeline and an ultrasonic frequency bandpass amplifier has been found expedient for noise discrimination purposes, the microphone may be replaced by any number of suitable transducers. A plurality of transducers may be utilized in connection with the various techniques of leak detection taught by the prior art and the communication between the surface and the pig may be by means other than the electromagnetic wave energy disclosed. The pig itself may also have any of a number of configurations, and may include means for recording the detection of the leak in the event the pig is continuously propelled through the pipeline. The pig may transmit immediately upon detection of a leak rather than responsively to an interrogation signal. In this event, the surface radio need not transmit except to restart the pig once it has been located. The invention is, therefore, to be limited to the language of the appended claims when accorded a full range of equivalents.

What is claimed is:

1. A pig for locating leaks in a fluid pipeline comprising:
    a frame adapted to traverse a pipeline through the interior thereof:
    a leak detector carried by said frame for detecting a fluid leak; and,
    propulsion means carried by said frame for propelling said frame through the pipeline, said propulsion means being inhibited responsively to the detection of a fluid leak by said leak detector.

2. The pig of claim 1 including a transmitter carried by said frame for transmitting a first wave energy signal in response to the detection of a leak by said leak detector.

3. The pig of claim 1 including a receiver carried by said frame for receiving wave energy signals, said propulsion means being enabled responsively to said receiver.

4. The pig of claim 3 including means carried by said frame for transmitting a first wave energy signal in response to the detection of a second wave energy signal.

5. The pig of claim 4 wherein the inhibition of said propulsion means responsively to the detection of a fluid leak by said leak detector is removed responsively to the termination of the detection thereof.

6. The apparatus of claim 5 including means external of the pipeline for detecting said first wave energy signal in synchronism with the transmission of said second wave energy signal.

7. The apparatus of claim 6 wherein the pipeline contains a static fluid under positive pressure.

8. The pig of claim 7 wherein said leak detector comprises an acoustic transducer for generating a first electrical signal; and,
wherein said propulsion means includes a screw, a source of electrical energy and an electric motor for driving said screw responsively to electrical energy from said source.

9. The pig of claim 1 wherein the pipeline contains a static fluid under positive pressure;
wherein said leak detector comprises an acoustic transducer for generating a first electrical signal; and,
wherein said propulsion means includes a screw, a source of electrical energy and an electric motor for driving said screw responsively to electrical energy from said source.

10. The pig of claim 1 wherein the inhibition of said propulsion means responsively to the detection of a fluid leak by said leak detector is removed responsively to the termination of the detection thereof.

11. The pig of claim 1 including a transmitter carried by said frame for transmitting a first wave energy signal in response to the detection of a leak by said leak detector and the detection of a second wave energy signal; and,
means external the pipeline for detecting said first wave energy signal and for transmitting said second wave energy signal.

12. A method of locating leaks in a fluid pipeline comprising the steps of:
a. internally traversing the pipeline with a self-propelled pig until a leak is detected;
b. inhibiting the propulsion of the pig in response to the detection of a leak;
c. transmitting a signal in response to the detection of a leak;
d. detecting the transmitted wave energy signal externally of the pipeline; and,
e. transmitting a wave energy signal from a source external of the pipeline to the pig to enable the propulsion thereof.

13. The method of claim 12 including the step of enabling the propulsion of the pig in response to the termination of the detection of a leak.

14. The method of claim 12 including the step of pressurizing the fluid within the pipeline prior to the internal traversal thereof by the pig.

15. A method of locating leaks in a fluid pipeline comprising the steps of:
a. internally traversing the pipeline with a self-propelled pig until a leak is detected;
b. inhibiting the propulsion of the pig in response to the detection of a leak; and,
c. enabling the propulsion of the pig in response to the termination of the detection of a leak.

16. A method according to claim 15 including the step of pressurizing the fluid within the pipeline prior to the internal traversal thereof by the pig wherein the leak is detected acoustically.

17. A pig for locating leaks in a fluid pipeline comprising:
a frame adapted to traverse a pipeline through the interior thereof;
a leak detector carried by said frame for detecting a fluid leak; and,
propulsion means carried by said frame for propelling said frame through the pipeline, said propulsion means being responsive in operation to said leak detector means.

18. A method of testing a fluid pipeline for leaks comprising the steps of:
a. inserting a self-propelled leak detector into the fluid pipeline to be tested; and,
b. internally traversing the fluid pipeline with the leak detector to detect leaks in response to the detection of leaks.

* * * * *